(12) United States Patent
Shin et al.

(10) Patent No.: US 8,855,119 B2
(45) Date of Patent: *Oct. 7, 2014

(54) METHOD AND APPARATUS FOR SETTING UP NETWORK FOR IP COMMUNICATION IN MOBILE TERMINAL

(71) Applicant: Samsung Electronics Co., Ltd., Gyeonggi-do (KR)

(72) Inventors: Dong-Yun Shin, Chungcheongnam-do (KR); Du-Seok Kim, Gyeonggi-do (KR); Giu-Yeol Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/856,861

(22) Filed: Apr. 4, 2013

(65) Prior Publication Data

US 2013/0230037 A1 Sep. 5, 2013

Related U.S. Application Data

(63) Continuation of application No. 13/493,457, filed on Jun. 11, 2012, now Pat. No. 8,422,475, which is a continuation of application No. 12/725,068, filed on Mar. 16, 2010, now Pat. No. 8,208,472.

(30) Foreign Application Priority Data

Mar. 16, 2009 (KR) .................. 10-2009-0022299

(51) Int. Cl.
*H04L 12/28* (2006.01)
*H04L 29/12* (2006.01)
*H04W 76/02* (2009.01)
*H04W 88/06* (2009.01)

(52) U.S. Cl.
CPC .............. *H04W 76/02* (2013.01); *H04W 88/06* (2013.01); *H04L 61/2092* (2013.01); *H04W 76/023* (2013.01); *H04L 29/1232* (2013.01)
USPC ............ 370/392; 370/328; 370/338; 370/352

(58) Field of Classification Search
None
See application file for complete search history.

(56) References Cited

U.S. PATENT DOCUMENTS

| 6,308,227 B1 | 10/2001 | Kumar et al. |
| 7,089,027 B1 | 8/2006 | Welch et al. |
| 7,487,230 B2 | 2/2009 | Gu et al. |
| 7,616,588 B2 * | 11/2009 | Gatta et al. .................... 370/254 |

(Continued)

FOREIGN PATENT DOCUMENTS

| EP | 1677491 | 12/2005 |
| KR | 1020030071981 | 9/2003 |

(Continued)

*Primary Examiner* — Duc C Ho
(74) *Attorney, Agent, or Firm* — The Farrell Law Firm, P.C.

(57) ABSTRACT

Methods and apparatus are provided for setting up a network for IP communication between mobile terminals. A first mobile terminal determines a second mobile terminal that will communicate with the first mobile terminal. The first mobile terminal generates a network setup message including network setup information of the second mobile terminal. The network setup message is sent from the first mobile terminal to the second mobile terminal. The first mobile terminal IP communicates with the second mobile terminal, which performs network setup based on the network setup information received from the first mobile terminal.

16 Claims, 8 Drawing Sheets

(56) References Cited

U.S. PATENT DOCUMENTS

| | | | |
|---|---|---|---|
| 8,422,475 B2* | 4/2013 | Shin et al. | 370/338 |
| 8,638,765 B2* | 1/2014 | Prakash et al. | 370/338 |
| 2003/0105841 A1 | 6/2003 | Miyake et al. | |
| 2003/0235174 A1 | 12/2003 | Pichna et al. | |
| 2004/0047323 A1 | 3/2004 | Park et al. | |
| 2005/0288045 A1 | 12/2005 | Yang et al. | |
| 2006/0111130 A1 | 5/2006 | Lee et al. | |
| 2006/0187900 A1 | 8/2006 | Akbar | |
| 2008/0101293 A1* | 5/2008 | Woo et al. | 370/331 |
| 2008/0261533 A1 | 10/2008 | Bengtsson et al. | |
| 2009/0233548 A1* | 9/2009 | Andersson et al. | 455/41.2 |
| 2009/0282123 A1 | 11/2009 | Fornari | |
| 2011/0002668 A1 | 1/2011 | Ando et al. | |
| 2011/0182242 A1 | 7/2011 | Enzmann et al. | |

FOREIGN PATENT DOCUMENTS

| | | |
|---|---|---|
| KR | 1020040004196 | 1/2004 |
| KR | 1020080030345 | 4/2008 |
| KR | 1020090022838 | 3/2009 |
| WO | WO2005038739 | 4/2005 |

* cited by examiner

METHOD AND APPARATUS FOR SETTING UP NETWORK FOR IP COMMUNICATION IN MOBILE TERMINAL

PRIORITY

This application is a Continuation Application from U.S. Pat. No. 8,422,475, filed in the U.S. Patent and Trademark Office on Jun. 11, 2012, which is a Continuation Application from U.S. Pat. No. 8,208,472, filed in the U.S. Patent and Trademark Office on Mar. 16, 2010, and which claims priority under 35 U.S.C. §119(a) to a Korean Patent Application filed in the Korean Intellectual Property Office on Mar. 16, 2009 and assigned Serial No. 10-2009-0022299, the entire disclosures of which are incorporated herein by reference.

BACKGROUND OF THE INVENTION

1. Field of the Invention

The present invention relates generally to a mobile communication terminal (hereinafter referred to as a "mobile terminal"), and more particularly, to a method and an apparatus for setting up a network for Internet Protocol (IP) communication in a mobile terminal.

2. Description of the Related Art

A variety of network technologies and services are applied to the many mobile/wireless terminals that have emerged in the field of mobile communication and wireless communication (or IP communication). Conventional mobile terminals support only a mobile phone function and short message delivery. However, mobile terminals have developed into smart phones supporting complex functions such as wireless broadcast, data communication, and multimedia playback. Additionally, the advent of mobile PC-type devices, such as mini notebook computers, net-books and Mobile Internet Devices (MIDs), has made it possible to support the functions of a mobile communication domain and an IP-based wireless communication domain, such as IP-based Wireless Local Area Network (WLAN) in a single device.

The convergence of mobile communication functions and wireless communication functions enables a variety of services, such as, Internet access, file sharing, network games and group communication, based on a wireless communication network, such as, Wireless Local Area Network (LAN), Bluetooth and Ultra Wideband (UWB), along with traditional services based on mobile communication.

An IP-based WLAN communication system supports an infrastructure scheme and an Ad-hoc scheme. In the infrastructure scheme, WLAN devices existing in a communication area of a wireless Access Point (AP) are connected to each other via the AP. Specifically, a first device communicates with a second device via an AP. The AP serves as a relay between the first device and the second device. The Ad-hoc scheme supports Peer-to-Peer (P2P) communication between devices each having a WLAN interface. In the Ad-hoc scheme, two devices communicate with each other directly without an additional device like the AP.

FIGS. 1A and 1B show access methods during general WLAN communication. FIG. 1A shows an Ad-hoc scheme, in which a first device 101 and a second device 102 directly access each other for communication. FIG. 1B shows an infrastructure scheme, in which the first device 101 communicates with the second device 102 via an AP 103.

Generally, for IP-based communication, every terminal needs the setting items shown in Table 1 below. The setting process may be modified by simplifying or omitting part according to a security setting or an IP setting. However, performance of the basic network setup is required.

TABLE 1

| Setting Items | Details |
| --- | --- |
| WLAN On/Off | WLAN On |
|  | WLAN Off |
| Device Access Mode Setting | Ad-Hoc mode |
|  | AP mode |
|  | Ad-Hoc + AP mode |
| Network Setup | DHCP (Automatic) |
|  | Manual Setting |
|  | IP Address setting |
|  | Subnet Mask setting |
|  | Default Gateway setting |
|  | DNS setting |
| Security Setting | WEP setting |
|  | WEP release |
|  | Encryption setting |
| Network Key Setting | Network Key setting |
|  | Network Key inputting |

The 'WLAN On/Off' item in Table 1 indicates whether a WLAN interface is used after completion of the basic network setup process. Because of its large power consumption, WLAN basically supports a sleep mode in a non-transmission state. When not using WLAN, a mobile terminal turns off the WLAN by blocking its WLAN interface. Therefore, the mobile terminal should switch the WLAN to the On-state when it needs to reuse the WLAN.

The "Device Access Mode Setting" item indicates any one of the Ad-hoc scheme and the infrastructure scheme that the user wants when using the WLAN. The Ad-hoc scheme, in which devices are connected to each other directly for communication without an AP, may be utilized for Phone-to-Phone communication. The infrastructure scheme, in which two devices are connected to each other via an AP, operates in general WLAN communication. However, the infrastructure scheme may not be used in a place without the AP.

The "Network Setup" item sets an IP, and when using a Dynamic Host Configuration Protocol (DHCP) function, each terminal may be automatically assigned an IP and may set a necessary protocol. However, the terminal sets a network setup option with DHCP. Unlike the DHCP setting, a manual setting method is inconvenient because each terminal inputs an assigned IP and other setting information one by one.

The "Security Setting" item sets a Wired Equivalent Privacy (WEP) for security of WLAN communication. Compared to wire communication, WLAN is vulnerable to security because all data is transmitted wirelessly. Therefore, in many cases, WLAN sets network security using the WEP setting.

The "Network Key Setting" item sets a network key. When sharing WLAN, all devices in the range (or coverage) of WLAN may access the communication network in principle. Therefore, a network key may be set to restrict users so that only authorized users may access the network. Specifically, a network establisher sets a network key and a device attempting to access the network may not access the WLAN unless it inputs the set network key.

The latest mobile terminals, to which an IP-based communication function like WLAN is added, may provide a variety of services, such as file transfer, E-mail transmission/reception, wireless Internet access, network games, and group communication, in addition to the existing mobile communication services. In order to use WLAN communication, each terminal performs WLAN network setup. However, due to the significant complexity of the network setup process as shown in Table 1, users may need basic knowledge about the network in order to use the WLAN. Because of the complex procedure for performing network setup for WLAN communication, the majority of ordinary users lacking the network knowledge may have a low utilization of WLAN communication over mobile terminals.

If every terminal is automatically assigned an IP address and a network configuration parameter by the conventional DHCP setting, the complex setting items mentioned in Table 1 may be reduced in number. However, this method selects a DHCP setting option, and if a network security setting or a network key is set, the user identifies access information and directly inputs the information. Also, a DHCP access method requires that an AP or a router supporting a DHCP server function be supported and that a DHCP client function be supported in a user terminal.

WLAN has structural security vulnerability because it transmits data wirelessly and may search for all terminals existing in a particular area. If the security setting or the network key for WLAN communication is not set, the network may be exposed to malicious attacks by the third parties, causing serious problems.

Wireless IP communication is less used by ordinary users due to the inconvenience that each terminal is required to perform the security setting and access setting by itself.

SUMMARY OF THE INVENTION

The present invention has been made to address at least the above problems and/or disadvantages and to provide at least the advantages described below. Accordingly, an aspect of the present invention provides a method and an apparatus for performing network setup for IP communication, in which a mobile terminal supporting IP communication may perform network setup for IP communication in a less complex manner than the conventional network setup, ensure security of network setup information, and prevent an unauthorized third party from participating in IP communication.

According to one aspect of the present invention, a method is provided for setting up a network for IP communication between mobile terminals. A first mobile terminal determines a second mobile terminal that will communicate with the first mobile terminal. The first mobile terminal generates a network setup message including network setup information of the second mobile terminal. The network setup message is sent from the first mobile terminal to the second mobile terminal. The first mobile terminal IP communicates with the second mobile terminal, which performs network setup based on the network setup information received from the first mobile terminal.

According to another aspect of the present invention, a mobile terminal is provided for performing IP communication. The mobile terminal includes a storage for storing information. The mobile terminal also includes an IP network module for performing IP communication. The mobile terminal further includes a controller for determining a second mobile terminal that will communicate with the mobile terminal, generating a network setup message including network setup information of the second mobile terminal, sending the network setup message to the second mobile terminal, and IP communicating with the second mobile terminal, which performs network setup based on the network setup information received from the mobile terminal.

According to an additional aspect of the present invention, a mobile terminal is provided for performing IP communication. The mobile terminal includes a storage for storing information, and an IP network module for performing IP communication. The mobile terminal also includes a controller for receiving a message from a second mobile terminal, determining whether the received message is a network setup message including network setup information of the mobile terminal, extracting the network setup information by analyzing the received network setup message when the received message is the network setup message, and performing network setup for IP communication with the second mobile terminal that has generated the network setup message, based on the extracted network setup information, when the received message is the network setup message.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Figure 1A:
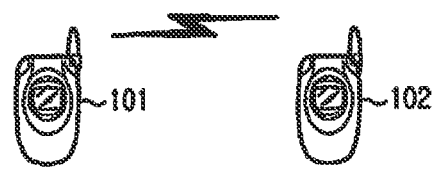
FIGS. 1A and 1B are diagrams illustrating access methods during general WLAN communication.
Figure 1B:
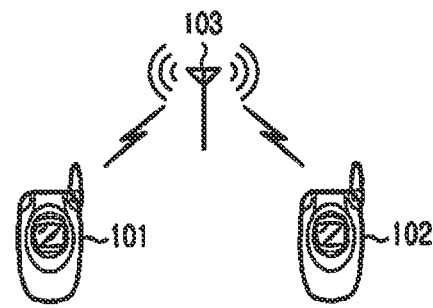

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The present invention provides a method and an apparatus for setting up a network for IP communication in a mobile terminal. A first mobile terminal determined to request connection of IP communication performs setup of its network. A message including network setup information of a second mobile terminal determined to receive the IP communication request is generated. The generated message is sent to a counterpart terminal with which the first mobile terminal will perform IP communication, over a mobile communication network (hereinafter referred to as a "mobile network"). The message including network setup information is received by the counterpart terminal. The received message is analyzed. Network setup for IP communication is automatically performed using the network setup information included in the message.

Figure 2:
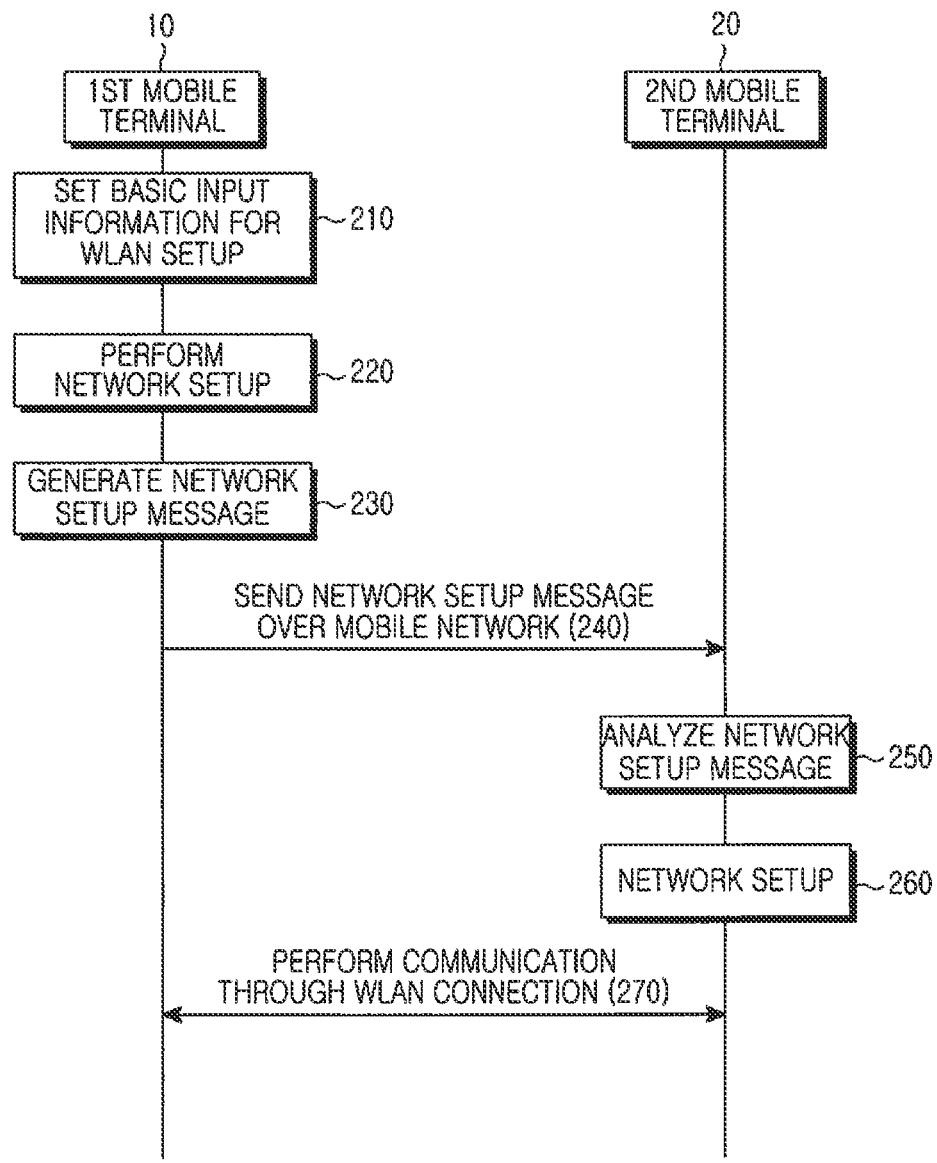
FIG. 2 is a flow diagram illustrating a network access operation for IP communication between mobile terminals, according to an embodiment of the present invention.

FIG. 2 is a flow diagram illustrating a network access operation for IP communication between mobile terminals, according to an embodiment of the present invention. FIG. 2 shows an initial network access operation for a WLAN service based on IP communication. A description is provided of a WLAN network access operation between a mobile terminal 10 (hereinafter referred to as a "first mobile terminal") requesting a WLAN service and a mobile terminal 20 (hereinafter referred to as a "second mobile terminal") that performs WLAN communication by receiving the WLAN service request from the first mobile terminal 10.

Referring to FIG. 2, in step 210, the first mobile terminal 10 sets basic input information for WLAN setup in order to perform a WLAN service. More specifically, the first mobile terminal 10 sets a WLAN range or a number of second mobile terminals 20 capable of participating in WLAN communication, and determines or sets at least one second mobile terminal 20 with which the first mobile terminal 10 will communicate.

The WLAN range is defined by determining the second mobile terminals 20 capable of participating in the current WLAN communication. Specifically, the WLAN range may be set such that only a few terminals may access the network, a plurality of terminals may access the network on a group basis, or all terminals intending to participate in the communication may access the network. The determination of the at least one terminal that will perform communication with the first mobile terminal 10 may be achieved based on an input signal received by the user by searching a previously stored phone book or selecting a phone number from a preset list. The determination may also be based on an input signal received by the user by inputting a phone number directly.

While only one second mobile terminal 20 is shown in FIG. 2, the first mobile terminal 10 may perform IP communication with a plurality of second mobile terminals 20 through the same procedure according to the set range of WLAN.

The reason for receiving a mobile phone number of the second mobile terminal 20 with which the first mobile terminal 10 will communicate is to send a message including network setup information to the received phone number over a mobile network.

In step 220, the first mobile terminal 10 performs its own network setup for WLAN communication. A network of the first mobile terminal 10 is set up according to the basic input information for WLAN setup, which was set in step 210. This step includes setting a Service Set Identifier (SSID), an Internet Protocol (IP) address, a subnet mask, a default gateway, a Wired Equivalent Privacy (WEP), and a network key of the first mobile terminal 10.

The range of accessible second mobile terminals 20 may be set using the IP address and the subnet mask. If Ad-hoc P2P communication is set so that only two terminals may access each other, the range may be designated by adjusting a network Identifier (ID) and a host ID of an IP address. By designating a communication range by setting the IP address and the subnet mask, it is possible to prevent terminals other than the desired terminal from participating in the current WLAN communication. For secure communication, the WEP setting may be performed and then the network key may be generated to prevent a terminal that does not know the generated network key from participating in the communication.

The first mobile terminal 10 may designate not only its own network setup information for WLAN, but also network setup information of the second mobile terminal 20. For example, the first mobile terminal 10 may generate its own IP address by generating a network ID and a host ID, and assign an IP address existing in the range of the subnet mask to each of the second mobile terminals 20. This enables fast network setup when the second mobile terminal 20 receives a message including network setup information, thus enhancing the security of the network.

In step 230, the first mobile terminal 10 generates a network setup message including network setup information of the second mobile terminal 20. A plurality of messages may be generated according to the number of second mobile terminals 20 that will perform communication with the first mobile terminal 10. The network setup message is generated in the form of a general Short Message Service (SMS) or a Multimedia Messaging Service (MMS) message.

In step 240, the first mobile terminal 10 sends the generated network setup message to the second mobile terminal 20 over the mobile network.

In step 250, the second mobile terminal 20 receives the network setup message and extracts network setup information included in the network setup message. The second mobile terminal 20 analyzes the received message and automatically extracts information needed to access the WLAN network generated by the first mobile terminal 10.

The extracted information includes all information necessary for network setup and all information necessary for WLAN access, including an IP address, a subnet mask, a default gateway, a WEP and a network key for terminals desiring to access the network, and information (an IP address and a MAC address) about the first mobile terminal 10. This information is defined during network setup in step 220.

In step 260, the second mobile terminal 20 performs network setup for WLAN communication with the first mobile terminal 10 using the network setup information extracted in step 250. The extracted network setup information includes information about an application that the first mobile terminal 10 desires to service. Based on this information, the application may be activated upon WLAN access.

In step 270, communication is performed through a WLAN connection between the first mobile terminal 10 and the second mobile terminal 20.

Figure 3:
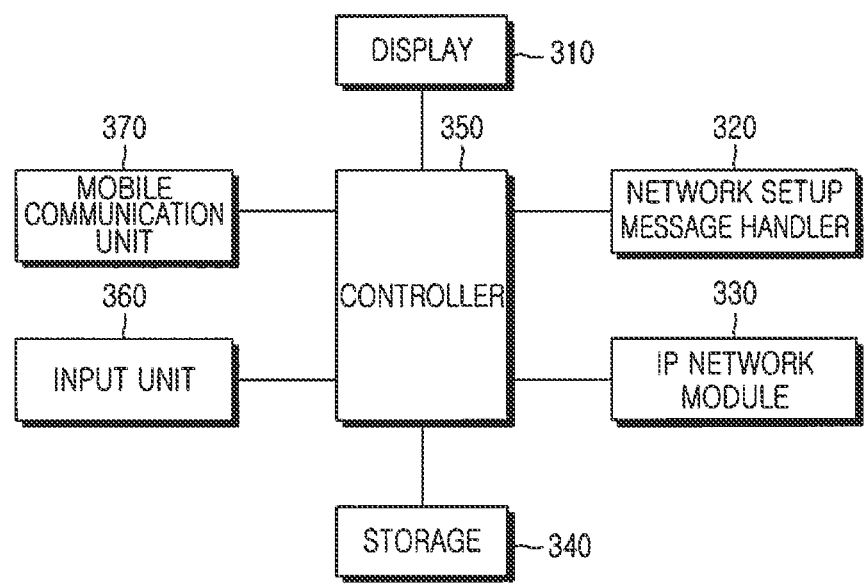
FIG. 3 is a block diagram illustrating a mobile terminal, according to an embodiment of the present invention.

FIG. 3 is a block diagram illustrating a mobile terminal, according to an embodiment of the present invention.

Referring to FIG. 3, a mobile terminal includes a display 310, a network setup message handler 320, an IP network module 330, a storage 340, a controller 350, an input unit 360, and a mobile communication unit 370.

The mobile terminal of FIG. 3 may serve as either the first mobile terminal 10, or the second mobile terminal 20 that performs IP communication with the first mobile terminal 10. Also, components and functions of the mobile terminal may be separated such that the mobile terminal may serve as only the first mobile terminal 10 or the second mobile terminal 20.

The storage 340 stores information that the mobile terminal needs for its operation. In an embodiment of the present invention, the storage 340 stores information about an application the terminal desires to service through WLAN communication. The application may includes applications that are supportable based on WLAN communication, such as file sharing, network games and group communication.

The input unit 360 may include a keypad and/or a touch screen, and delivers a user input signal to the controller 350. In an embodiment of the present invention, the first mobile terminal 10 receives mobile phone numbers of second mobile terminals 20 with which it will perform WLAN communication.

The display 310 displays various display information of the mobile terminal. In an embodiment of the present invention, the display 310 displays various processing results and check points during a network setup operation for IP communication.

The mobile communication unit 370 transmits and receives data such as voice data and messages over the mobile network.

The network setup message handler 320 generates a network setup message including network setup information of the second mobile terminal 20, when the terminal serves as the first mobile terminal 10. In generating the network setup message, the network setup message handler 320 includes a preset value in a header part of the network setup message so that the network setup message may be distinguished from general messages.

When the terminal serves as the second mobile terminal 20, upon receipt of a message, the network setup message handler 320 determines whether the received message is a network setup message including network setup information. If the received message is a network setup message, the network setup message handler 320 extracts network setup information from the received message. The determination of whether the received message is a general message or a network setup message is achieved by checking a header part of the received message.

When the terminal serves as the first mobile terminal 10, the controller 350 receives, through the input unit 360, information about the number of second mobile terminals 20 capable of participating in the WLAN communication and information about at least one second mobile terminal 20 that will communicate with the first mobile terminal 10. The controller 350 generates its own network setup information for the WLAN communication, and controls the IP network module 330 to perform network setup using the network setup information. The controller 350 also controls the network setup message handler 320 to generate a network setup message including network setup information of the second mobile terminals 20 and to send the generated network setup message to the second mobile terminal 20 over the mobile network.

When the terminal serves as the second mobile terminal 20, upon receipt of a message over the mobile network, the controller 350 determines whether the received message is a network setup message. If the received message is a network setup message, the controller 350 controls the network setup message handler 320 to analyze the received network setup message and extract network setup information from the network setup message. The controller 350 also controls the IP network module 330 to perform network setup for WLAN communication with the first mobile terminal 10 based on the extracted network setup information.

The IP network module 330 sets up a network according to the network setup information generated by the controller 350, and performs IP communication depending on the set network. When the terminal serves as the second mobile terminal 20, the IP network module 330 performs network setup using network setup information extracted from the received network setup message.

Figure 4:
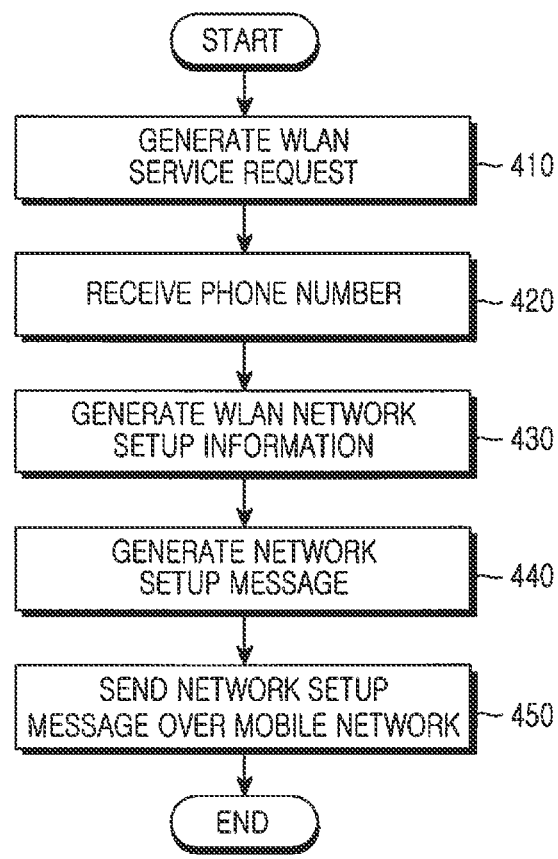
FIG. 4 is a flowchart illustrating an operation of a first mobile terminal during network access for IP communication between mobile terminals, according to an embodiment of the present invention.

FIG. 4 is a diagram illustrating an operation of a first mobile terminal during network access for IP communication between mobile terminals, according to an embodiment of the present invention.

Referring to FIG. 4, in step 410, the first mobile terminal 10 generates a WLAN service request during execution of an application or by selecting WLAN communication on a menu of the first mobile terminal 10. In step 420, the controller 350 displays a WLAN range and display items on the display 310 to receive a phone number of the second mobile terminal 20 with which the first mobile terminal 10 wants to communicate. The controller 350 determines the second mobile terminal 20 with which it will communicate, based on the information received from the user.

In step 430, the controller 350 generates WLAN network setup information of the first mobile terminal 10, and delivers the generated information to the IP network module 330. The IP network module 330 sets up its network according to the network setup information. The network setup information includes an SSID, an IP address, a subnet mask, a default gateway, a WEP and a network key of the first mobile terminal 10. The IP network module 330 performs its own network setup and sets a WLAN state to the On-state, entering an idle state in which it receives data from the second mobile terminal 20. The IP network module 330 may deliver the network setup results to the controller 350 to display the network setup results on the display 310.

When generating the network setup information in step 430, the controller 350 determines an IP address and a subnet mask according to the WLAN range. Setting an IP address will be described in detail below with reference to FIGS. 5A, 5B and 5C.

Figure 5A:
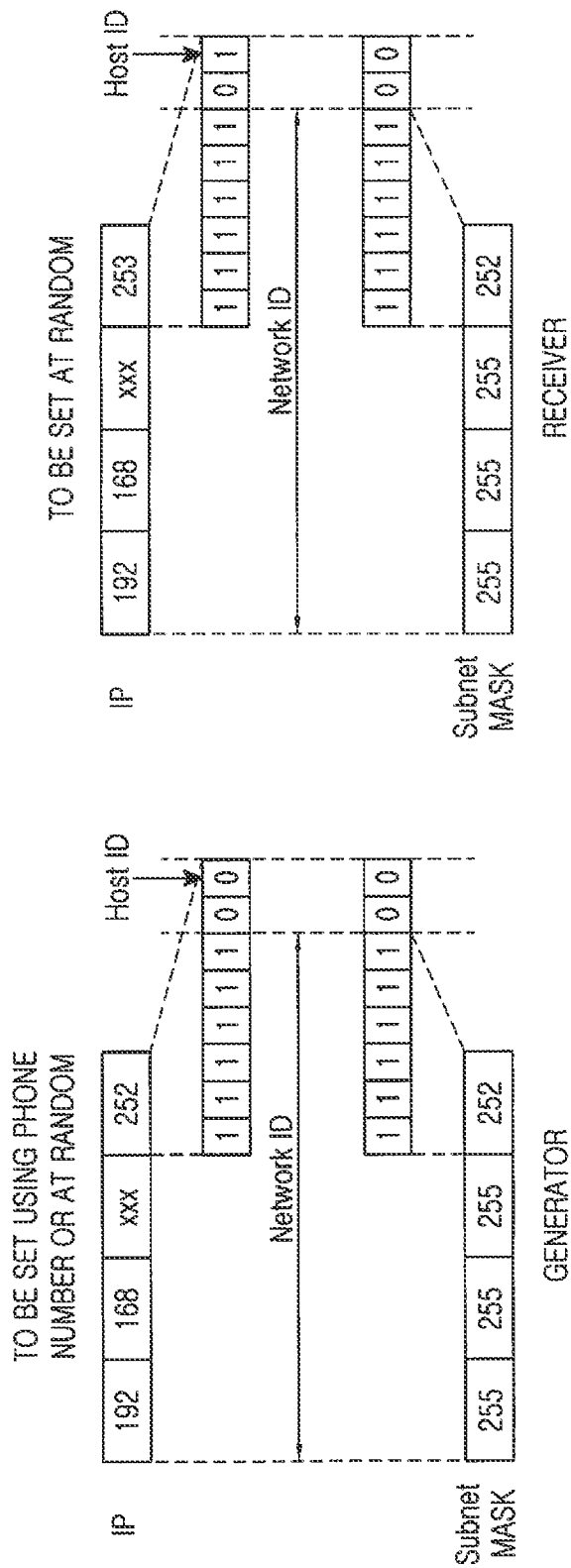
FIGS. 5A, 5B and 5C are diagrams illustrating how to set IP addresses of a first mobile terminal and a second mobile terminal during network access for IP communication between mobile terminals, according to an embodiment of the present invention.
Figure 5B:
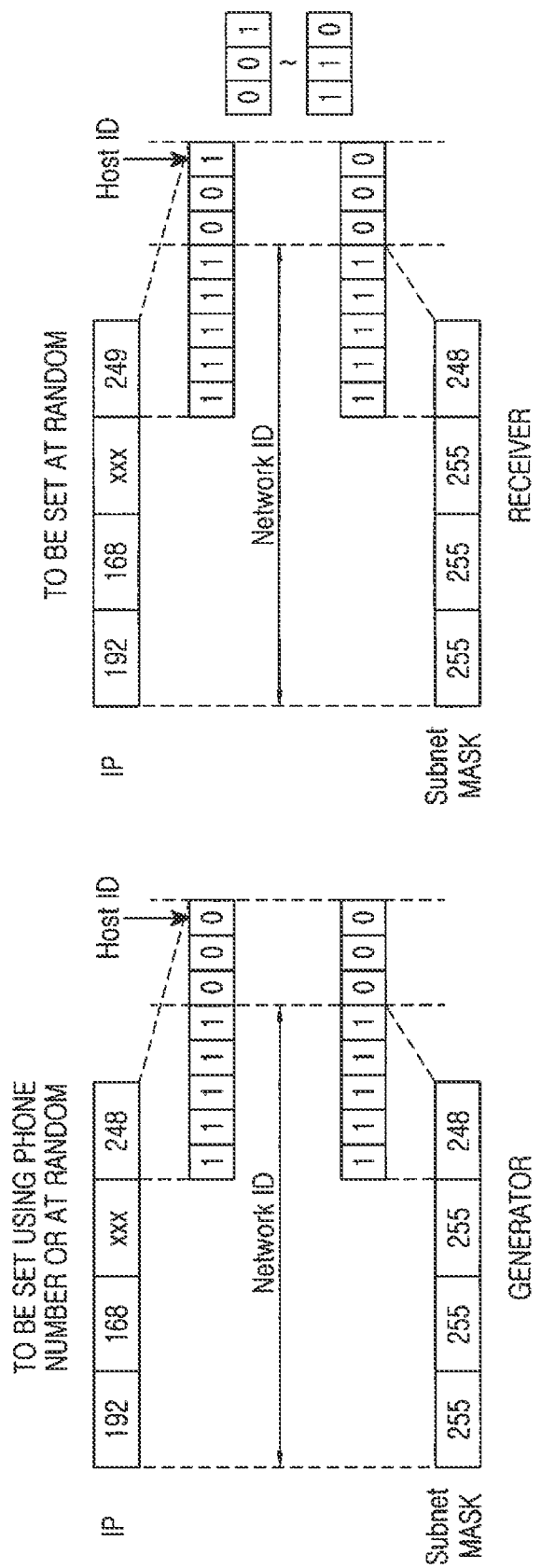
Figure 5C:
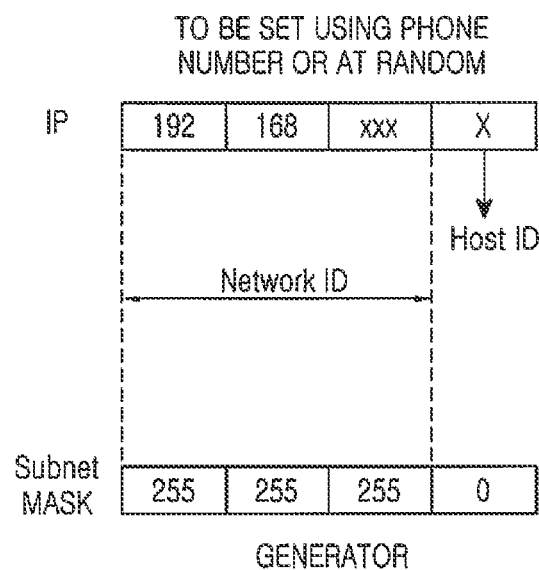

FIGS. 5A, 5B and 5C show how to set IP addresses of a first mobile terminal and a second mobile terminal during network access for IP communication between mobile terminals, according to an embodiment of the present invention. In an embodiment shown in FIGS. 5A, 5B and 5C, an IP address uses a private IP address and is based on a 192 network.

FIG. 5A illustrates a network setup during Peer-to-Peer (P2P) communication so that only a maximum of two second mobile terminals 20 may access the network. Since the network should be set up such that only a maximum of two second mobile terminals 20 can access the network, only two bits are assigned for a host ID field in an IP address. The first mobile terminal 10 and the two second mobile terminals 20 receiving a message may access the generated network. No other hosts (third parties) may access the network. Regarding a network ID of the first mobile terminal 10, for the network security, a third frame field of the IP address is set using a phone number of the first mobile terminal 10 or a random number as shown in FIG. 5A. This may reduce the probability of generating the same network since the first mobile terminal 10 has a unique identification number referred to as a mobile phone number. It is also possible to generate a specific network ID at random, but this is disadvantageous in that networks having the same random value may be generated in the same area. If a subnet mask field is set as '255.255.255.252' to represent a network ID field, the number of generable host's IP addresses is limited to 3. Thus, the first mobile terminal 10 is assigned one IP address and the remaining two IP addresses are assigned to the second mobile terminals 20.

FIG. 5B illustrates an example of setting IP addresses and a subnet mask when multiple second mobile terminals 20 are needed for group communication, network games, and the like. In order to enable multiple second mobile terminals 20 to access the network, three bits of the IP address are assigned for a host ID field, so that the first mobile terminal 10 is assigned one IP address and the remaining IP addresses are assigned to the second mobile terminals 20 one by one. Each of the second mobile terminals 20 sets an IP address assigned thereto, preventing collision of network IP addresses. A subnet mask is set as a desired group range such as, '255.255.255.248', thereby designating a host ID field.

FIG. 5C illustrates the same network setup as the IP address (C-class) communication. In order to prevent the IP address collision, an IP address may be assigned to each of the second mobile terminals 20, and when a function capable of assigning an IP address to each of second mobile terminals 20, like the DHCP function, may be used, IP addresses of the second mobile terminals 20 may not be set individually.

Further, the controller 350 may generate and use any SSID, and may set a security option and a network key for the network security.

Referring again to FIG. 4, in step 440, the network setup message handler 320 generates a network setup message including network setup information of the second mobile terminal 20 with which it intends to communicate, by receiving the network setup information from the controller 350. The network setup information of the second mobile terminal 20 includes an SSID, an IP address, a subnet mask, a default gateway, a WEP and a network key of the second mobile terminal 20. The network setup message is generated in the form of a general SMS or MMS message. In addition, the network setup message includes information about a security option or a network key corresponding to the network setup of the first mobile terminal 10, and also includes information about an IP address and a subnet mask that are set according to the WLAN range. If there exists an application that has requested WLAN communication, the network setup message may also include information about an application that is to be activated using the WLAN communication.

In step 450, the controller 350 sends the network setup message generated by the network setup message handler 320 to the second mobile terminal 20 through the mobile communication unit 370 and over the mobile network. The controller 350 sends the network setup message to the phone number of the second mobile terminal 20, which was received in step 420, over the mobile network.

Figure 6:
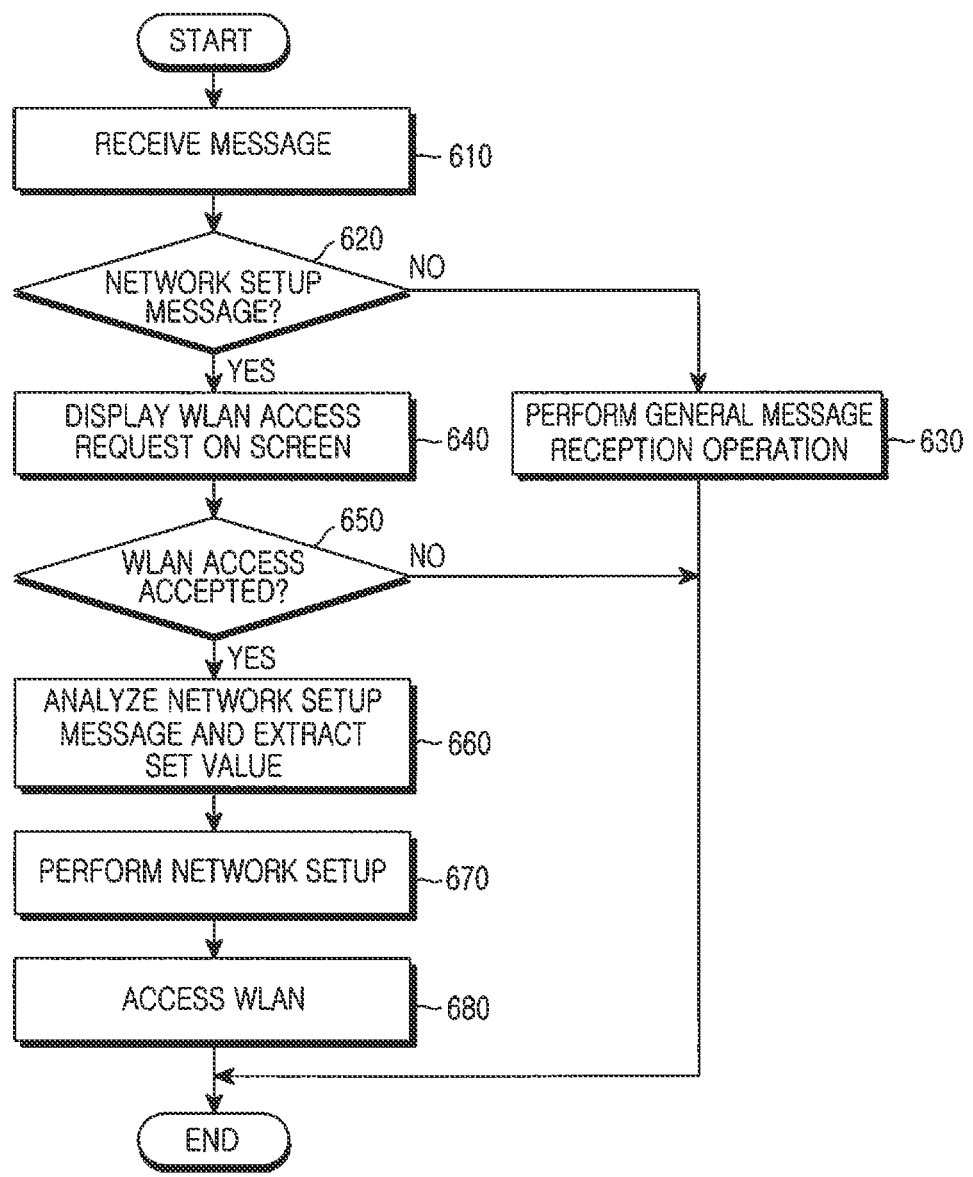
FIG. 6 is a flowchart illustrating an operation of a second mobile terminal during network access for IP communication between mobile terminals, according to an embodiment of the present invention.

FIG. 6 illustrates an operation of a second mobile terminal during network access for IP communication between mobile terminals, according to an embodiment of the present invention.

Upon receiving a message over a mobile network in step 610, the controller 350 determines whether the received message is a general message or a network setup message in step 620. If the received message is not a network setup message, the controller 350 performs a general message reception operation in step 630 and then ends the process. The determination of whether a received message is a general message or a network setup message in step 620 is achieved by checking a header part of the received message. If a preset value defined during generation of a network setup message is detected from a header part of the received message, the controller 350 determines the received message as the network setup message.

If the received message is a network setup message in step 620, the controller 350 displays a WLAN access request on the display 310 in step 640. The controller 350 may also display a screen asking the user whether to accept WLAN access.

In step 650, the controller 350 determines whether WLAN access is accepted. If WLAN access is not accepted in step 650, the controller 350 ends the process. If WLAN access is accepted, the controller 350 analyzes the received network setup message and extracts network setup information in step 660. The network setup information is defined in a message type having a specific standard, making it possible to extract desired information from a preset location.

In step 670, the controller 350 performs network setup for WLAN communication using the network setup information extracted by the IP network module 330.

In step 680, the controller 350 accesses WLAN and communicates with the first mobile terminal 10.

During WLAN communication in both the Ad-hoc scheme described above and in the conventional infrastructure mode, a first mobile terminal may generate a message including network setup information in a similar manner and send the message to a second mobile terminal over a mobile network so that the second mobile terminal may perform network setup.

As is apparent from the foregoing description, according to embodiments of the present invention, a mobile terminal supporting IP communication like WLAN may simply perform network setup for IP communication, thus increasing security of IP communication. Additionally, the mobile terminal may selectively set accessible terminals during network setup, thereby restricting access to undesired terminals.

Further, a network is set up using a unique identifier called a mobile phone number, and the network setup information is transmitted in the form of a security-guaranteed message of the mobile network, thus enabling more secure network configuration.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for setting up a network for Internet Protocol (IP) communication between mobile terminals, comprising the steps of:
   determining, by a first mobile terminal, a second mobile terminal that will communicate with the first mobile terminal;
   generating, by the first mobile terminal, a network setup message including network setup information of the second mobile terminal;
   sending the network setup message from the first mobile terminal to the second mobile terminal over a mobile network; and
   IP communicating, by the first mobile terminal, with the second mobile terminal, which performs network setup based on the network setup information received from the first mobile terminal, wherein the network setup message is in a form of a Short Message Service (SMS) message or a Multimedia Messaging Service (MMS) message.

2. The method of claim 1, wherein determining a second mobile terminal comprises setting a number of second mobile terminals capable of participating in the IP communication, and determining at least one second mobile terminal that will communicate with the first mobile terminal.

3. The method of claim 1, wherein the network setup information of the second mobile terminal comprises at least one of a Service Set Identifier (SSID), an IP address, a subnet mask, a default gateway, a Wired Equivalent Privacy (WEP) and a network key of the second mobile terminal.

4. The method of claim 3, wherein the network setup information of the second mobile terminal further comprises information about an application to be serviced through the IP communication.

5. The method of claim 3, wherein the subnet mask is set based on a number of second mobile terminals capable of participating in the IP communication.

6. The method of claim 3, wherein a third frame value of the IP address is set using a mobile phone number of the first mobile terminal, or is set randomly.

7. A mobile terminal for performing Internet Protocol (IP) communication, comprising:
   a storage for storing information;

an IP network module for performing IP communication; and a controller for determining a second mobile terminal that will communicate with the mobile terminal, generating a network setup message including network setup information of the second mobile terminal, sending the network setup message to the second mobile terminal over a mobile network, and IP communicating with the second mobile terminal, which performs network setup based on the network setup information received from the mobile terminal, wherein the network setup message is in a form of a Short Message Service (SMS) message or a Multimedia Messaging Service (MMS) message.

8. The mobile terminal of claim 7, wherein the controller sets a number of second mobile terminals capable of participating in the IP communication, and determines at least one second mobile terminal that will communicate with the mobile terminal.

9. The mobile terminal of claim 7, wherein the network setup information of the second mobile terminal comprises at least one of a Service Set Identifier (SSID), an IP address, a subnet mask, a default gateway, a Wired Equivalent Privacy (WEP) and a network key of the second mobile terminal.

10. The mobile terminal of claim 9, wherein the subnet mask is set based on a number of second mobile terminals capable of participating in the IP communication.

11. The mobile terminal of claim 7, wherein the network setup information of the second mobile terminal further comprises information about an application to be serviced through the IP communication.

12. The mobile terminal of claim 9, wherein a third frame value of the IP address is set using a mobile phone number of the mobile terminal, or is set randomly.

13. A mobile terminal for performing Internet Protocol (IP) communication, comprising:

a storage for storing information;

an IP network module for performing IP communication; and a controller for receiving a message from a second mobile terminal, determining whether the received message is a network setup message including network setup information of the mobile terminal, extracting the network setup information by analyzing the received network setup message when the received message is the network setup message, and performing network setup for IP communication with the second mobile terminal that has generated the network setup message, based on the extracted network setup information, when the received message is the network setup message.

14. The mobile terminal of claim 13, wherein the controller checks whether a preset value is included in a header part of the received message, and determines the received message is the network setup message if the preset value is included in the header part.

15. The method of claim 13, wherein the network setup information of the mobile terminal comprises at least one of a Service Set Identifier (SSID), an IP address, a subnet mask, a default gateway, a Wired Equivalent Privacy (WEP) and a network key of the mobile terminal.

16. The method of claim 13, wherein the network setup message is in a form of a Short Message Service (SMS) message or a Multimedia Messaging Service (MMS) message.

* * * * *